United States Patent [19]

Detrick et al.

[11] 3,897,251

[45] July 29, 1975

[54] PROCESS FOR UTILIZING A PHOTOPRINTING ARTICLE AND METHOD FOR MAKING SAID ARTICLE

[75] Inventors: Harry Rodney Detrick, Laceyville; Roland N. Harshbarger, Ulster, both of Pa.

[73] Assignee: GTE Sylvania Incorporated, Stamford, Conn.

[22] Filed: Sept. 13, 1973

[21] Appl. No.: 396,886

Related U.S. Application Data

[62] Division of Ser. No. 223,321, Feb. 3, 1972, Pat. No. 3,801,410.

[52] U.S. Cl. ....................... 96/38.3; 96/36.2; 161/1; 355/133

[51] Int. Cl. ............................................ G03c 5/00

[58] Field of Search ......... 96/38.3, 38.4, 36.1, 36.2; 364/1; 355/125, 133; 161/1

[56] References Cited

UNITED STATES PATENTS

| | | | |
|---|---|---|---|
| 3,519,348 | 7/1970 | McLaughlin | 355/125 |
| 3,567,447 | 3/1971 | Chand | 96/38.3 |
| 3,615,468 | 10/1971 | Tiala | 96/36.3 |
| 3,620,736 | 11/1971 | Tarkington | 96/36.2 X |
| 3,639,125 | 2/1972 | Champ | 96/38.3 |
| 3,674,492 | 7/1972 | Goldrick et al. | 96/38.3 |

*Primary Examiner*—Norman G. Torchin
*Assistant Examiner*—Edward C. Kimlin
*Attorney, Agent, or Firm*—Norman J. O'Malley; Lawrence R. Fraley; William H. McNeill

[57] ABSTRACT

A photographic master is disclosed wherein the master comprises a base of a transparent sheet, a plurality of upstanding configurations of exposed photographic emulsion material spaced in a predetermined pattern on the base, and a protective coating over the upstanding configurations and base to thereby provide a gas escapement means when the master is used to provide a pattern upon a metallic sheet in a contact printing process. An improved photoprinting process and a method for making the master are also disclosed.

5 Claims, No Drawings

PROCESS FOR UTILIZING A PHOTOPRINTING ARTICLE AND METHOD FOR MAKING SAID ARTICLE

CROSS REFERENCE TO RELATED APPLICATION

This application is a division of Ser. No. 223,321, filed Feb. 3, 1972 now U.S. Pat. No. 3,801,410 and assigned to the assignee of the present invention, Assignment Recorded Feb. 3, 1972, Reel 2826, Frame 939.

BACKGROUND OF THE INVENTION

This invention relates to the manufacture of precision articles from thin metallic sheets using photographic and etching techniques. More particularly it relates to improvements relating to the photoprinting step of the photoetching process and to new masters used in the process.

In general, the process includes the steps of cleaning the metallic sheet, coating the sheet with a light-sensitive or photoresist material, photoprinting a desired pattern onto the coated surfaces by subjecting them to light through a photographic master, removing an exposed or unexposed portion of the photoresist and etching away the portions not covered by the resist. In most instances during the photoprinting step, the surface of the metallic sheet is coated with the light-sensitive resist material and is then moved to a station containing the master and stopped when in the desired position. Close contact between the master and the coated metallic sheet is achieved by applying a vacuum. Close contact between the metallic sheet and the master insures that precisely defined patterns are projected on the sensitized material. The metallic sheet is then exposed to actinic light for a predetermined period of time while the masters are held in close contact with the sheet. After a suitable exposure time, the frame is separated and the metallic sheet is transferred to the etching and finishing steps.

The photographic masters generally have a photographic emulsion in the form of the desired pattern over a transparent base to achieve a suitable degree of rigidity.

The master, either in the form of a negative or a positive, intermittently contacts the coated sheet. It is also essential that the master make essentially flat contact with the metallic sheet to obtain uniform exposure. The vacuum is applied to remove any air pockets that are present between the master and the metallic sheet. In order to prevent excessive wear or damage to the emulsion on the master during the photoprinting step, a protective coating can be applied to the emulsion surface.

As can be appreciated, the printing step is intermittent in nature. The other steps of cleaning, etching, resist application and removal can be continuous. The printing step, therefore, is often a bottleneck in the process and a reduction of the time required to accomplish this step would constitute a substantial improvement to the photoprinting process.

One particular prior art process utilized to reduce this required time is disclosed in U.S. Pat. No. 3,615,468 and assigned to the same assignee as that of the present Applicants. This process teaches the use of a photographic master having a solid protective coating over the emulsion on the base of a transparent sheet, this coating containing a plurality of minute particles. These particles form protrusions in the external coating, thereby providing an irregular surface against the metallic sheets. While this process provided an adequate gas escapement means during the close contact between master and sheet, these particles, having a degree of hardness greater than that of the metal, occasionally marred the surface of the sheets. It is believed, therefore, that it would be an advancement in the art to provide a photographic master and process which would enable a substantial reduction in the time required to accomplish the printing step while insuring that deformation to the surface of the metallic sheets will not occur.

Because a new photographic master of this variety is the end result of a new and unique method of master production, it is also felt that such a method would be an advancement in the art.

OBJECTS AND SUMMARY OF THE INVENTION

It is, therefore, an object of this invention to provide an improved photoprinting process useful in the contact printing of thin metallic sheets.

It is another object of this invention to provide a photographic master which substantially reduces the time required to accomplish the printing step of these metallic sheets while still insuring that deformation to the surface of the metallic sheets will not occur.

Still another object of this invention is to provide a method for making the photographic master.

In accordance with one aspect of this invention there is provided a new master in the photoetching process. The master comprises a base of a transparent sheet having at least one essentially planar surface which describes a first plane. Spaced in a predetermined pattern on designated portions of the planar surface of the base are a plurality of upstanding configurations of emulsion material. These configurations and the remaining portions of the base having no emulsion material are covered with a solid protective coating, the coating and configurations forming a gas escapement means when the master and the metallic sheet are brought into contact.

In accordance with another aspect of this invention there is provided a new and unique method for making this master in which a base of a transparent sheet having a coating of unexposed emulsion material thereon is mated with a standard master and selected portions of the unexposed emulsion are exposed to light to thereby produce a pattern of exposed emulsion material. The base and emulsion are then subjected to a photographic developing solution which serves to darken the previously exposed portions of emulsion material.

These newly darkened portions are then removed when the base is subjected to a photographic reversing solution, whereupon the base and remaining unexposed emulsion, now in the form of a plurality of upstanding configurations, are exposed to a light source. Next, the base and newly exposed configurations of emulsion material are subjected to a photographic developing solution which darkens the configurations. The configurations are then hardened when the base is subjected to a photographic hardening solution, after which the base and configurations are heated for a predetermined period. The final step in producing this new master is the application of a solid protective coating which covers the configurations and portions of the base not occupied by the configurations.

A further aspect of this invention provides an improvement to the photoetching process.

For a better understanding of the present invention, together with other and further objects, advantages, and capabilities thereof, reference is made to the following disclosure and appended claims in connection with the above description of the invention.

DESCRIPTION OF THE PREFERRED EMBODIMENTS

As previously mentioned, a master used in the contact printing of a thin metallic sheet must be in essentially flat contact with the sheet in order to achieve uniformity of the products produced. To achieve this contact, a vacuum is generally applied to the printing frame to remove essentially all of the air between the master and sheet. Since the degree of contact is generally directly related to the vacuum produced in the printing frame, suitable contact can be calculated on the basis of the vacuum developed. It has been discovered that a master developed in such a manner so as to be provided with a plurality of upstanding configurations of photographic emulsion material spaced in a predetermined pattern on the base of a transparent sheet and coated with a solid protective coating will form a gas escapement means when the master and sheet are in contact. The gas escapement means allows the air trapped in the inner portion of the printing frame between the sheet and master to be rapidly removed and thus reduces the time required to achieve suitable contact as determined by the degree of vacuum produced.

To produce a new master of this variety has consequently resulted in the development of a new and unique method for making such masters. The first step in this method involves coating a base of a transparent sheet with a suitable photographic emulsion. Although any transparent material, such as various plastics, can be used, glass is generally preferred as a base since it is dimensionally stable particularly under changing temperature and humidity conditions, as is most often the case in the photoetching process of metallic sheets.

An emulsion suitable for use in this invention can be derived from almost any of the photographic emulsions known in the art. Emulsions of this variety, as is well known, usually comprise millions of tiny crystals or grains of a sparingly soluble salt of silver dispersed in a water-permeable binder, usually gelatin.

This emulsion is applied evenly over the surface of the base and is then dried, this drying most usually accomplished by placing the base in a drying oven for an established period of time.

The next step in this method for making the master is to mate the base and coating with a standard master having a darkened pattern formed thereon. This mating is accomplished simply by placing the emulsion coating of the base against the darkened patterned surface of the standard and withdrawing any air present from between the two surfaces. This air withdrawal assures a close contact.

Light is now projected through the standard master and onto corresponding portions of the emulsion coating not protected by the standard's darkened pattern. The period of the light exposure may range from 10 seconds to 1 minute or more depending on the type of emulsion used.

Upon completion of the light exposure step, the base and emulsion, of which selected portions are now exposed, is subjected to a photographic developing solution for a period of approximately 3.5 minutes, the purpose of which is to darken the exposed portions of the emulsion. A typical developer solution which can be utilized in conjunction with this invention is described on page 372 of Volume 15 of the Encyclopedia of Chemical Technology, Second Edition. A typical formula for such a developer is as follows: Elon (p-(methylamino) phenol sulfate), 2.5g; sodium sulfite, 30g; Hydroquinone, 2.5g; sodium metaborate tetrahydrate, 10g; potassium bromide, 0.5; and water to make 1 liter. Larger quantities are produced by proportionally increasing the individual components of the formula. Although this developer is suitable for the developing step of this invention, it is understood that this formula is by no means restrictive in that practically any of the many photographic developing solutions known in the art can be used. To prohibit a possible runaway of the developing action created by the developer, the base is now placed in a tank of stop bath solution for approximately 1 minute. This solution is known in the art and comprises a simple formula of 1 part acetic acid to 40 parts water.

The next step in preparing the new master is to selectively remove the darkened exposed portions of the emulsion from the base. This is achieved by subjecting the base to a photographic reversing solution, many of which are known in the art. The base is immersed in a tank of this solution for a period of 4 minutes. A typical formula, given in percentage by weight, for a reversing solution, and that which is preferred by Applicants, is as follows: Cupric Chloride, 0.5 percent; Citric Acid, 7.5 percent; Urea, 7.5 percent; Commercial hydrogen peroxide (30 percent concentration) 5.0%; and the remaining 79.5 percent consisting of water. In preparing this solution, Applicants have found it preferable to combine the first three components with the water, after first heating the water to approximately 130°F. The hydrogen peroxide is then added after the solution has cooled sufficiently.

Removal of the darkened exposed portions of emulsion is now accomplished, leaving a plurality of upstanding configurations of unexposed emulsion spaced in a predetermined pattern on the surface of the base. These configurations, as will be more adequately explained with further description, ultimately determine the pattern to be produced on the metallic sheets. Many varied patterns in the metallic sheet can be produced, one typical example being an aperture mask for a television tube. In this particular example, a sheet having several tiny substantially similar apertures formed therein is manufactured, consequently necessitating an emulsion pattern of substantially similar upstanding configurations. This is not a stipulation of the procedure however, because a pattern of upstanding configurations being dissimilar is also applicable to this type of manufacturing, a typical example being the production of lead frames for integrated circuits in which several varying patterns of circuitry are formed.

With the darkened emulsion now removed, and an unexposed pattern of upstanding emulsion remaining thereon, the base is now subject to a light exposure. While this exposure is occurring, Applicants have found it desirable, though not necessary, to place the base under a water rinse to remove any residue which may have built up as a result of the previous reversing step. The base is thereafter wiped dry.

To darken the remaining upstanding pattern of emulsion in the base, the base is immersed in a photographic developing solution similar to that previously described for a period of 5 minutes or more. Runaway of the developing solution is prohibited in much the same manner as also previously described, that being to immerse the base in a stop bath solution of 1 part acetic acid to 40 parts water. To harden the upstanding configurations of emulsion, the base is next subject to a photographic hardening solution, several of which are known in the art. A typical formula for such a solution, given by percentage of weight is: Sodium Thiosulfate, 25.0 percent; Sodium Sulfit, 1.6 percent; Acetic acid (30 percent concentration), 4.7 percent; Cloric acid crystals, 0.7 percent; Potassium alum, 1.6 percent; and the remaining 66.4 percent consisting of water. The base is immersed in the hardener for a period of 2 minutes after which it is once again placed under a rinse. This rinse, usually water, removes any of the hardener solution still present on the base. Thorough drying of the base and emulsion is now achieved by placing the base in a drying oven. Applicants have found that a temperature range of approximately 100°F for a period of one half hour is adequate for this purpose.

The final step in producing the new master is to coat the upstanding configurations of exposed emulsion and the portions of the base not occupied by this emulsion with a solid protective coating. The composition of this aspect of the invention comprises a light sensitive, light hardenable substance, a typical example being polyvinyl alcohol sensitized with ammonium dichromate. Other liquid coatings can be used if desired, such as epoxy resins, silicones, thin film plastics, and the like.

When the coating is applied over the configurations and on the unoccupied portions of the base, the end result is that valleys are formed between the configurations. As can be understood, these valleys form a gas escapement means during contact between the master and metallic sheet in the photoprinting step. On a production line producing television aperture masks from a metal sheet and using a master of the prior art which did not deform the metal surface, the time required to achieve substantially internal contact between master and sheet was in excess of 2 minutes. In the master utilizing the coating containing minute projections, the time was reduced to approximately 1 minute. The new master as developed by the previously described method reduces this time even further, to approximately 30 seconds, a substantial saving in production time.

It is also to be noted that in most instances the photographic pattern will be applied to both sides of the metal sheet, the designs being in register with one another so that etching can be accomplished on both sides of the sheet. Generally, the same procedure will be utilized in producing both masters when the above method is used, since the photostations are essentially duplicates on each side of the sheet. When this method is used, in order to achieve maximum benefits from the present invention, similar masters are used so that the time required for the creation of the vacuum will be essentially similar.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a process wherein a relatively thin flat metallic sheet is coated with a light sensitive material, a design is photoprinted on said light sensitive material by use of a master in contact with said coated metallic sheet and contact is established by use of vacuum printing frames and portions of said coating are rendered selectively removable by said photoprinting step and a design is thereafter etched in said sheet, and wherein a master is brought into contact with said sheet wherein said master consists essentially of:

a base of a transparent sheet having at least one essentially planar surface that describes a first plane;

a plurality of upstanding configurations of exposed photographic emulsion material, said configurations spaced in a predetermined pattern to thereby occupy designated portions of said planar surface of said base; and a solid protective coating formed over said plurality of upstanding configurations and portions of said planar surface of said base unoccupied by said upstanding configurations of said emulsion material, said configurations and said coating thereby providing a gas escapement means when said photographic master and said flat metallic sheet are in contact.

2. The process according to claim 1 in which said protective coating is a light sensitive and light hardenable material.

3. A method for making a photographic master useful in a photoetching process wherein said photographic master is brought into contact with a flat metallic sheet, said method comprising:

mating a base of a transparent sheet having a coating of unexposed photographic emulsion material thereon with a standard master and projecting light through said standard master onto said coating to thereby produce a pattern of exposed emulsion material;

subjecting said base with said pattern of exposed emulsion material to a photographic developing solution to thereby darken said pattern of exposed emulsion material;

subjecting said base with said darkened pattern of emulsion material to a photographic stop bath solution to prohibit further developing action of said developing solution;

subjecting said base with said darkened pattern of emulsion material to a photographic reversing solution to thereby remove said darkened pattern of emulsion material from said base, thereby leaving a plurality of upstanding configurations of unexposed emulsion material on said base;

projecting light onto said upstanding configurations of unexposed emulsion material to thereby expose said upstanding configurations;

subjecting said base with said exposed upstanding configurations of emulsion material to said photographic developing solution to thereby darken said upstanding configurations of emulsion material;

subjecting said base with said darkened upstanding configurations to said photographic stop bath solution to prohibit further developing action of said developing solution;

subjecting said base with said darkened upstanding configurations to a photographic hardening solution;

subjecting said base with said darkened upstanding configurations to a rinse to remove said hardening solution;

heating said base with said darkened upstanding configurations for a predetermined period of time; and coating said base and said darkened upstanding configurations of emulsion material with a solid protective coating.

4. The method according to claim 3 in which said base with said upstanding configurations of unexposed emulsion material is subjected to a water rinse prior to projecting light onto said configurations.

5. The method according to claim 3 in which said solid protective coating is a light sensitive and light hardenable material.

* * * * *